US012254703B2

(12) United States Patent
Takaku et al.

(10) Patent No.: US 12,254,703 B2
(45) Date of Patent: Mar. 18, 2025

(54) CONTROL DEVICE, CONTROL METHOD, AND COMPUTER-READABLE RECORDING MEDIUM

(71) Applicant: HONDA MOTOR CO., LTD., Tokyo (JP)

(72) Inventors: Hiroki Takaku, Tokyo (JP); Zekun Xiu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 18/113,190

(22) Filed: Feb. 23, 2023

(65) Prior Publication Data

US 2023/0290154 A1 Sep. 14, 2023

(30) Foreign Application Priority Data

Mar. 14, 2022 (JP) ................................ 2022-039039

(51) Int. Cl.
*G06V 20/58* (2022.01)
*B60R 1/27* (2022.01)

(52) U.S. Cl.
CPC ................ *G06V 20/58* (2022.01); *B60R 1/27* (2022.01); *B60R 2300/105* (2013.01)

(58) Field of Classification Search
CPC .... G06V 20/58; B60R 1/27; B60R 2300/105; B60R 1/00; B60R 2300/607
See application file for complete search history.

(56) References Cited

U.S. PATENT DOCUMENTS

| | | | | |
|---|---|---|---|---|
| 2006/0274147 | A1 | 12/2006 | Chinomi et al. | |
| 2012/0300075 | A1 | 11/2012 | Yamamoto et al. | |
| 2013/0332062 | A1 | 12/2013 | Kreitmair-Steck et al. | |
| 2019/0116315 | A1 * | 4/2019 | Satomi | H04N 23/90 |
| 2023/0266440 | A1 * | 8/2023 | Acharya | G01S 17/931 356/4.01 |

FOREIGN PATENT DOCUMENTS

| | | | |
|---|---|---|---|
| JP | 2006-341641 | A | 12/2006 |
| JP | 2012-244600 | A | 12/2012 |
| JP | 2018-050277 | A | 3/2018 |
| JP | 2020-182220 | A | 11/2020 |

OTHER PUBLICATIONS

Oct. 31, 2023, translation of Japanese Office Action issued for related JP Application No. 2022-039039.

* cited by examiner

*Primary Examiner* — Farzana Hossain
(74) *Attorney, Agent, or Firm* — Paratus Law Group, PLLC

(57) ABSTRACT

A control device includes circuitry configured to: obtain an external environment recognition image representing a recognition result of a surrounding area of a moving body; obtain obstacle information representing a detection result of an obstacle in the surrounding area of the moving body; and display the obstacle information on a display device in a superimposed manner on the external environment recognition image. The obstacle information indicates a region in which the obstacle is detected among a plurality of fan-shaped detection regions centered at the moving body when viewed from above the moving body, and a size of a central angle of the fan-shaped detection region is set according to a distance from the moving body.

8 Claims, 7 Drawing Sheets

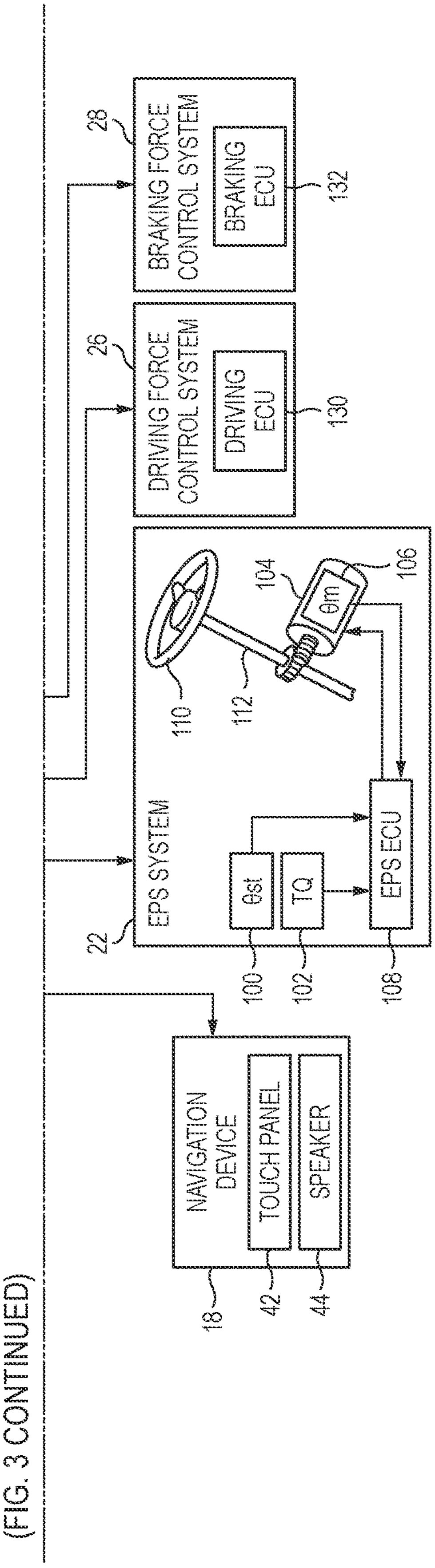
(FIG. 3 CONTINUED)

CONTROL DEVICE, CONTROL METHOD, AND COMPUTER-READABLE RECORDING MEDIUM

CROSS-REFERENCE TO RELATED APPLICATIONS

This application is based on and claims priority under 35 USC 119 from Japanese Patent Application No. 2022-039039 filed on Mar. 14, 2022, the contents of which are incorporated herein by reference.

TECHNICAL FIELD

The present disclosure relates to a control device, a control method, and a computer-readable recording medium.

BACKGROUND

In recent years, efforts have been actively made to provide access to sustainable transportation systems in consideration of vulnerable traffic participants. In order to achieve this goal, attention is focused on research and development to further improve safety and convenience of traffic through research and development related to a driving assistance technique.

The related art discloses a technique of displaying an image of a surrounding area of a vehicle captured by an in-vehicle camera or the like on a display device of the vehicle during low-speed movement such as parking. A known technique displays information on an obstacle detected by a sensor or the like in a superimposed manner on an image of a surrounding area of a vehicle when displaying the image of the surrounding area of the vehicle. Japanese Patent Application Laid-Open Publication No. 2020-182220 (hereinafter, referred to as Patent Literature 1) discloses a top view image generation device that detects an obstacle by a sensor or the like and changes a display position of an icon indicating the obstacle with respect to an icon indicating a host vehicle according to a distance to the detected obstacle when displaying a top view image of a surrounding area of the vehicle.

Japanese Patent Application Laid-Open Publication No. 2006-341641 (hereinafter, referred to as Patent Literature 2) discloses an image display device that displays, when an obstacle is detected by an obstacle detection unit, obstacle information indicating the detected obstacle in a direction of the detected obstacle in a superimposed manner on a direct image captured by a camera and a top view image of a surrounding area of a vehicle created by using the direct image.

Patent Literature 1 discloses that the display position of the obstacle information indicating the obstacle is changed according to the distance from the vehicle to the obstacle, but there is no description regarding respective appearance of the obstacle information at different display positions. In addition, with the image display device according to Patent Literature 2, it is possible to display the top view image in which the obstacle information indicating the obstacle is reproduced in a distorted form, and the direct image in which the obstacle information is expressed in a form that is less distorted and closer to the actual obstacle. However, there is no description regarding improvement of appearance of the obstacle information in the top view image. Therefore, in a driving assistance technique, there is room for improvement in a way of displaying obstacle information on an obstacle that is displayed in a superimposed manner on a peripheral image of a surrounding area of a vehicle.

The present disclosure provides a control device, a control method, and a computer-readable recording medium storing a control program that enable to display information on an obstacle detected in an image of a surrounding area of a vehicle in a superimposed manner in a form that does not cause any sense of discomfort. This contributes to development of a sustainable transportation system.

SUMMARY

A first aspect of the present disclosure relates to a control device including circuitry configured to:

obtain an external environment recognition image representing a recognition result of a surrounding area of a moving body;

obtain obstacle information representing a detection result of an obstacle in the surrounding area of the moving body; and display the obstacle information on a display device in a superimposed manner on the external environment recognition image, in which the obstacle information indicates a region in which the obstacle is detected among a plurality of fan-shaped detection regions centered at the moving body when viewed from above the moving body, and a size of a central angle of the fan-shaped detection region is set according to a distance from the moving body.

A second aspect of the present disclosure relates to a control method performed by a control device, including:

obtaining an external environment recognition image representing a recognition result of a surrounding area of a moving body, obtaining obstacle information representing a detection result of an obstacle in the surrounding area of the moving body, and displaying the obstacle information on a display device in a superimposed manner on the external environment recognition image, in which the obstacle information indicates a region in which the obstacle is detected among a plurality of fan-shaped detection regions centered at the moving body when viewed from above the moving body, and a size of a central angle of the fan-shaped detection region is set according to a distance from the moving body.

A third aspect of the present disclosure relates to a non-transitory computer-readable recording medium storing a control program for causing a processor of a control device to execute a process, the process including:

obtaining an external environment recognition image representing a recognition result of a surrounding area of a moving body, obtaining obstacle information representing a detection result of an obstacle in the surrounding area of the moving body, and displaying the obstacle information on a display device in a superimposed manner on the external environment recognition image, in which the obstacle information indicates a region in which the obstacle is detected among a plurality of fan-shaped detection regions centered at the moving body when viewed from above the moving body, and a size of a central angle of the fan-shaped detection region is set according to a distance from the moving body.

According to the present disclosure, it is possible to provide a control device, a control method, and a computer-readable recording medium storing a control program capable of displaying information on an obstacle detected in an image of a surrounding area of a vehicle in a superimposed manner in a form that does not cause any sense of discomfort.

BRIEF DESCRIPTION OF DRAWINGS

Exemplary embodiment(s) of the present invention will be described in detail based on the following figures, wherein.

DESCRIPTION OF EMBODIMENTS

Figure 1:
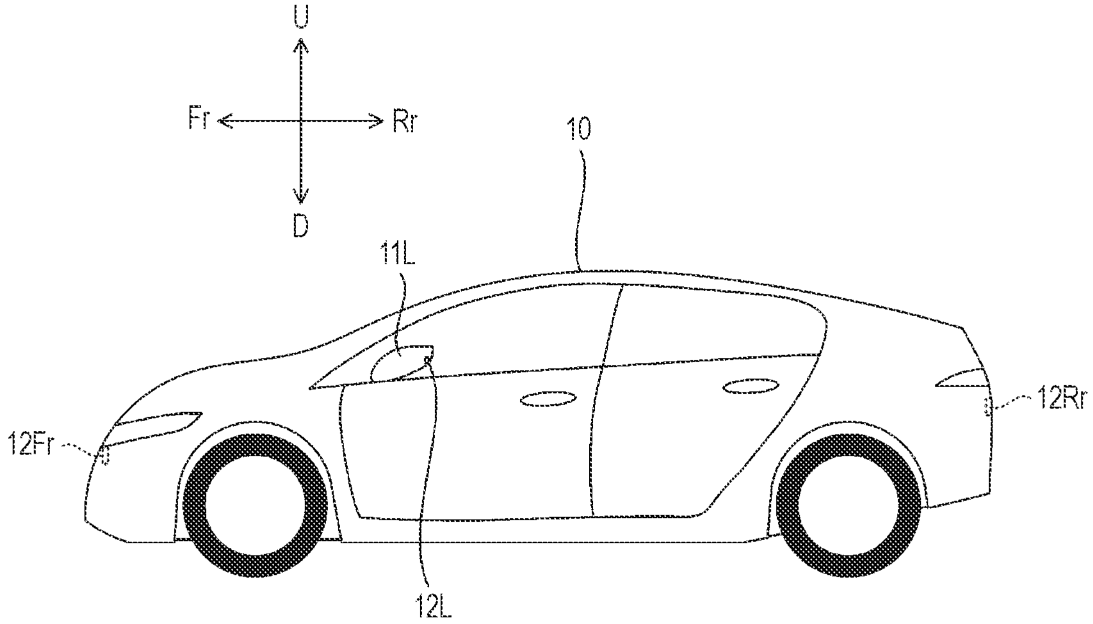
FIG. 1 is a side view showing an example of a vehicle whose movement is controlled by a control device according to an embodiment.

Hereinafter, an embodiment of a control device according to the present disclosure will be described with reference to the accompanying drawings. The drawings are viewed in directions of reference signs. In addition, in the present specification and the like, in order to simplify and clarify the description, a front-rear direction, a left-right direction, and an up-down direction are described according to directions viewed from a driver of a vehicle 10 shown in FIGS. 1 and 2. In the drawings, a front side of the vehicle 10 is denoted by Fr, a rear side thereof is denoted by Rr, a left side thereof is denoted by L, a right side thereof is denoted by R, an upper side thereof is denoted by U, and a lower side thereof is denoted by D.

<Vehicle 10 Whose Movement is Controlled by Control Device According to Present Disclosure>

Figure 2:
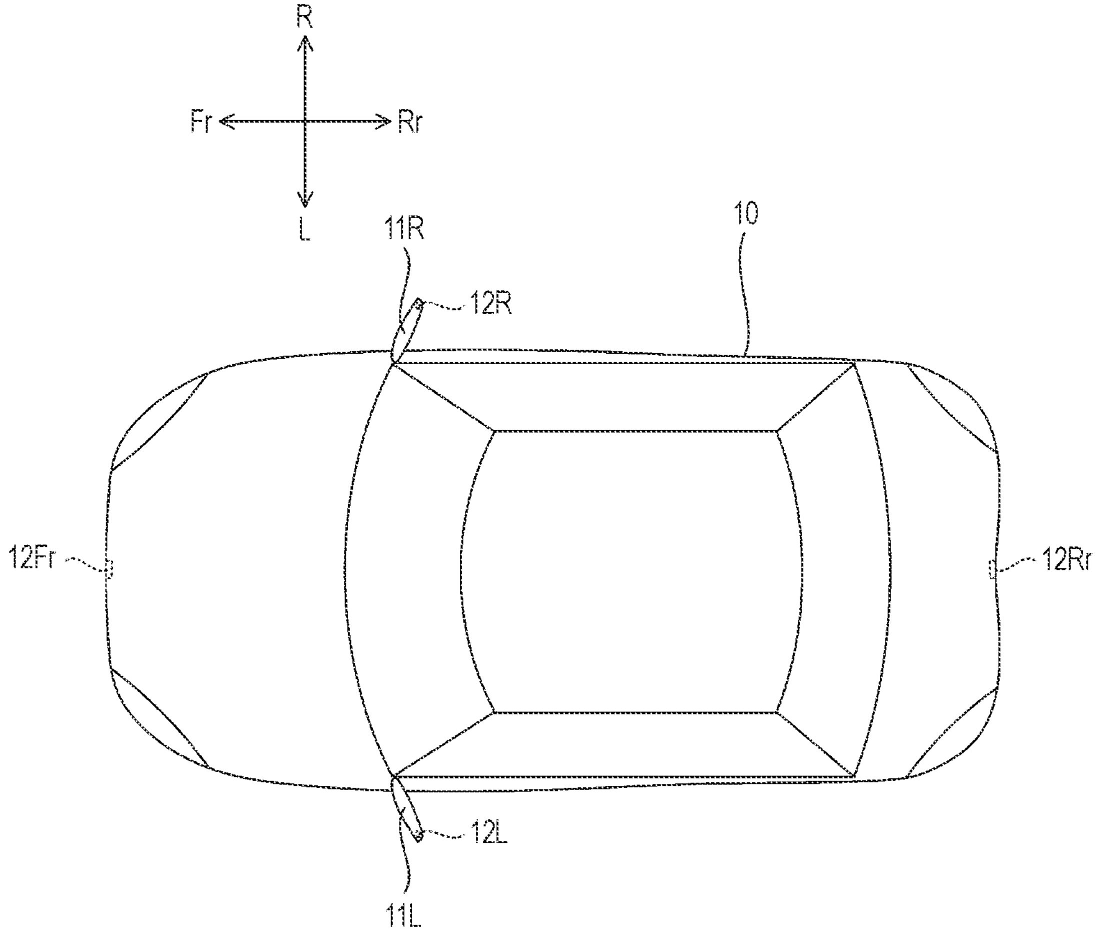
FIG. 2 is a top view of the vehicle shown in FIG. 1.

FIG. 1 is a side view of the vehicle 10 whose movement is controlled by the control device according to the disclosure. FIG. 2 is a top view of the vehicle 10 shown in FIG. 1. The vehicle 10 is an example of a moving body in the disclosure.

The vehicle 10 is an automobile including a drive source (not shown) and wheels including driving wheels driven by power of the drive source and steering wheels that are steerable. In the present embodiment, the vehicle 10 is a four-wheeled automobile including a pair of left and right front wheels and a pair of left and right rear wheels. The drive source of the vehicle 10 is, for example, an electric motor. The drive source of the vehicle 10 may also be an internal combustion engine such as a gasoline engine or a diesel engine, or a combination of an electric motor and an internal combustion engine. In addition, the drive source of the vehicle 10 may drive the pair of left and right front wheels, the pair of left and right rear wheels, or four wheels, that is, the pair of left and right front wheels and the pair of left and right rear wheels. The front wheels and the rear wheels may both be steering wheels that are steerable, or one of the front wheels and the rear wheels may be steering wheels that are steerable.

The vehicle 10 further includes side mirrors 11L and 11R. The side mirrors 11L and 11R are mirrors (rearview mirrors) that are provided outside front seat doors of the vehicle 10 for the driver to check a rear side and a rear lateral side. Each of the side mirrors 11L and 11R is fixed to a body of the vehicle 10 by a rotation shaft extending in a vertical direction and can be opened and closed by rotating about the rotation shaft.

The vehicle 10 further includes a front camera 12Fr, a rear camera 12Rr, a left side camera 12L, and a right side camera 12R. The front camera 12Fr is a digital camera that is provided at a front portion of the vehicle 10 and captures an image of a front side of the vehicle 10. The rear camera 12Rr is a digital camera that is provided at a rear portion of the vehicle 10 and captures an image of a rear side of the vehicle 10. The left side camera 12L is a digital camera that is provided on the left side mirror 11L of the vehicle 10 and captures an image of a left side of the vehicle 10. The right side camera 12R is a digital camera that is provided on the right side mirror 11R of the vehicle 10 and captures an image of a right side of the vehicle 10.

<Internal Configuration of Vehicle 10>

Figure 3:
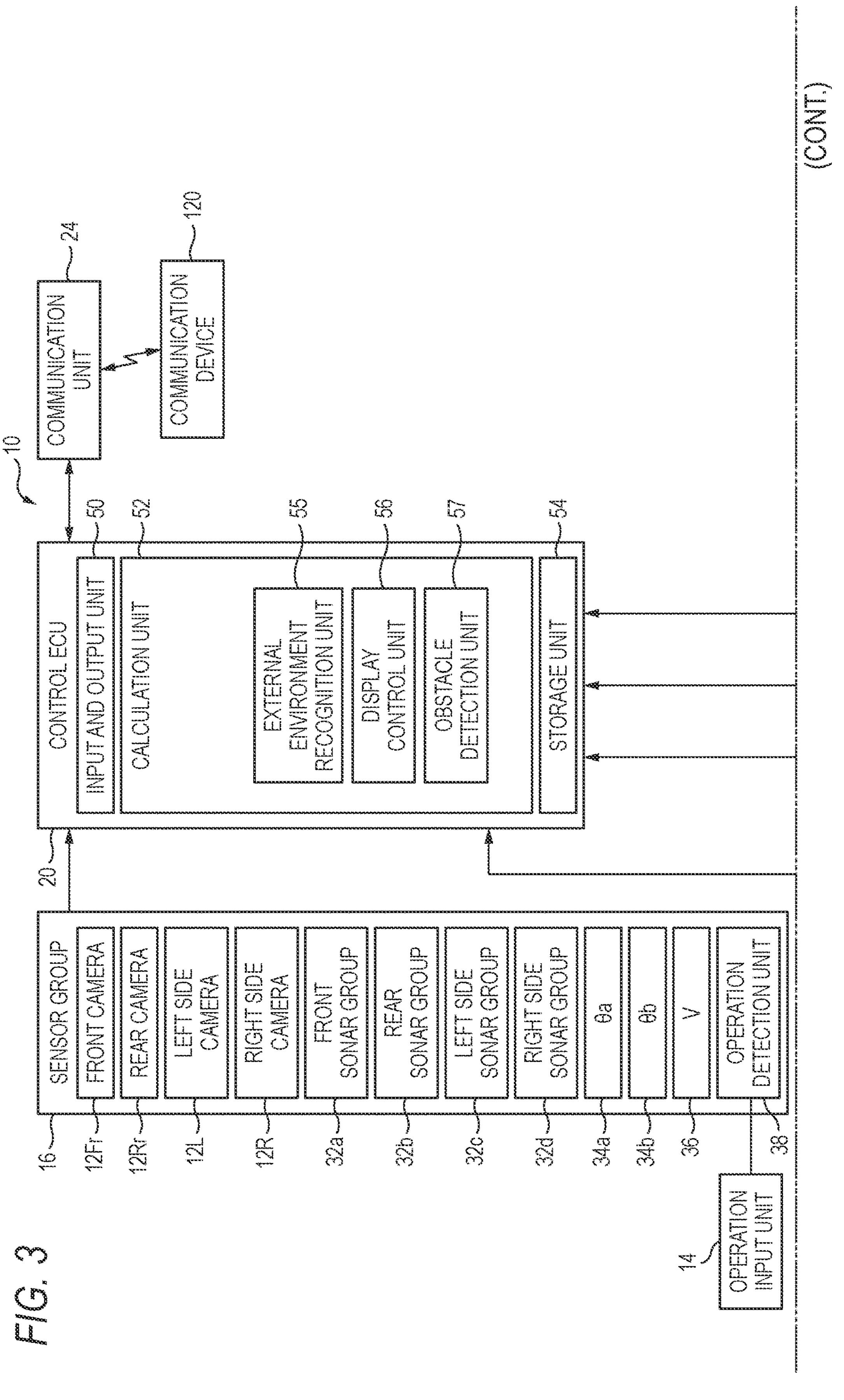
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 obtains various detection values used for control performed by the control ECU 20. The sensor group 16 includes the front camera 12Fr, the rear camera 12Rr, the left side camera 12L, and the right side camera 12R. In addition, the sensor group 16 includes a front sonar group 32*a*, a rear sonar group 32*b*, a left side sonar group 32*c*, and a right side sonar group 32*d*. In addition, the sensor group 16 includes wheel sensors 34*a* and 34*b*, a vehicle speed sensor 36, and an operation detection unit 38. The sensor group 16 may include a radar.

The front camera 12Fr, the rear camera 12Rr, the left side camera 12L, and the right side camera 12R obtain recognition data (for example, an external environment recognition image) for recognizing a surrounding area of the vehicle 10 by capturing images of the surrounding area of the vehicle 10. An external environment recognition image captured by the front camera 12Fr is referred to as a front recognition image. An external environment recognition image captured by the rear camera 12Rr is referred to as a rear recognition image. An external environment recognition image captured by the left side camera 12L is referred to as a left side recognition image. An external environment recognition image captured by the right side camera 12R is referred to as a right side recognition image. An image formed by the left side recognition image and the right side recognition image may be referred to as a side recognition image. An external environment recognition image generated by synthesizing imaging data of the front camera 12Fr, the rear camera 12Rr, the left side camera 12L, and the right side camera 12R may be referred to as a top view image of the vehicle 10.

The front sonar group 32*a*, the rear sonar group 32*b*, the left side sonar group 32*c*, and the right side sonar group 32*d* emit sound waves to the surrounding area of the vehicle 10 and receive reflected sounds from other objects. The front sonar group 32*a* includes, for example, four sonars. The sonars constituting the front sonar group 32*a* are respectively provided on an obliquely left front side, a front left side, a front right side, and an obliquely right front side of the vehicle 10. The rear sonar group 32*b* includes, for example, four sonars. The sonars constituting the rear sonar group 32*b* are respectively provided on an obliquely left rear side, a rear left side, a rear right side, and an obliquely right rear side of the vehicle 10. The left side sonar group 32*c* includes, for example, two sonars. The sonars constituting the left side sonar group 32*c* are provided in the front of a left side portion of the vehicle 10 and the rear of the left side portion, respectively. The right side sonar group 32*d* includes, for example, two sonars. The sonars constituting the right side sonar group 32*d* are provided in the front of a right side portion of the vehicle 10 and the rear of the right side portion, respectively. The front sonar group 32*a*, the rear sonar group 32*b*, the left side sonar group 32*c*, and the right side sonar group 32*d* obtain detection data (for example, obstacle information) for detecting an obstacle in the surrounding area of the vehicle 10.

The wheel sensors 34*a* and 34*b* detect a rotation angle of the wheel of the vehicle 10. The wheel sensors 34*a* and 34*b* may be implemented by angle sensors or displacement sensors. The wheel sensors 34*a* and 34*b* output detection pulses each time the wheel rotates by a predetermined angle. Detection pulses outputted from the wheel sensors 34*a* and 34*b* are used to calculate the rotation angle of the wheel and a rotation speed of the wheel. A movement distance of the vehicle 10 is calculated based on the rotation angle of the wheel. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V. and outputs the detected vehicle speed V to the control ECU 20. The vehicle speed sensor 36 detects the vehicle speed V based on, for example, rotation of a countershaft of a transmission.

The operation detection unit 38 detects a content of an operation performed by a user using an operation input unit 14 and outputs the detected content of the operation to the control ECU 20. The operation input unit 14 includes, for example, various user interfaces such as a side mirror switch that switches opened and closed states of the side mirrors 11L and 11R, and a shift lever (a select lever or a selector).

The navigation device 18 detects a current position of the vehicle 10 by using, for example, a global positioning system (GPS), and guides the user along a route toward a destination. The navigation device 18 includes a storage device (not shown) that includes a map information database.

The navigation device 18 includes a touch panel 42 and a speaker 44. The touch panel 42 functions as an input device and a display device of the control ECU 20. The speaker 44 outputs various types of guidance information to the user of the vehicle 10 by voice.

The touch panel 42 is configured to input various commands to the control ECU 20. For example, the user can input a command via the touch panel 42 to display the external environment recognition image of the vehicle 10. In addition, the touch panel 42 is configured to display various screens related to a control content of the control ECU 20. For example, the external environment recognition image of the vehicle 10 is displayed on the touch panel 42. Constituent elements other than the touch panel 42, for example, a head-up display (HUD), a smartphone, or a tablet terminal may be used as the input device or the display device.

The control ECU 20 includes an input and output unit 50, a calculation unit 52, and a storage unit 54. The calculation unit 52 is implemented by, for example, a central processing unit (CPU). The calculation unit 52 performs various types of control by controlling each unit based on a program stored in the storage unit 54. In addition, the calculation unit 52 receives and outputs signals from and to each unit connected to the control ECU 20 via the input and output unit 50.

The calculation unit 52 includes an external environment recognition unit 55 that recognizes the external environment recognition image, a display control unit 56 that controls display of the external environment recognition image, and an obstacle detection unit 57 that recognizes an obstacle in the surrounding area of the vehicle 10. The calculation unit 52 is an example of a control device in the disclosure.

The external environment recognition unit 55 obtains, from each camera, the external environment recognition image representing a recognition result of a peripheral image of the vehicle 10 captured by the front camera 12Fr, the rear camera 12Rr, the left side camera 12L, and the right side camera 12R.

The obstacle detection unit 57 obtains, from each sonar, obstacle information representing a detection result of an obstacle in the surrounding area of the vehicle 10 detected by the front sonar group 32*a*, the rear sonar group 32*b*, the left side sonar group 32*c*, and the right side sonar group 32*d*. For example, the obstacle detection unit 57 obtains, from each sonar, obstacle information representing a detection result of an obstacle detected in the surrounding area of the vehicle 10 when the vehicle 10 is parked or exits a parking space. Examples of the obstacle include an object that can interfere with traveling of the vehicle 10, such as a person, an animal, another vehicle, and a planting. The parking or exit of the vehicle 10 may be parking or exit implemented by autonomous driving, driving assistance, or manual driving. In addition, the detection device that detects the obstacle in the surrounding area of the vehicle 10 may be, for example, a LIDAR, a radar, or the cameras 12Fr, 12Rr, 12L, and 12R in addition to the sonars.

The display control unit 56 displays the external environment recognition image obtained by the external environment recognition unit 55 on a display device of the vehicle 10. Specifically, the display control unit 56 displays, on the touch panel 42, the front recognition image captured by the front camera 12Fr, the rear recognition image captured by the rear camera 12Rr, the left side recognition image captured by the left side camera 12L, and the right side recognition image captured by the right side camera 12R. In addition, the display control unit 56 displays, on the touch panel 42, the top view image of the vehicle 10 generated by synthesizing the imaging data of the front camera 12Fr, the rear camera 12Rr, the left side camera 12L, and the right side camera 12R.

In addition, the display control unit 56 displays the obstacle information on the touch panel 42 in a superimposed manner on the external environment recognition image. For example, the display control unit 56 displays the obstacle information on the touch panel 42 in a superimposed manner on the front recognition image, the rear recognition image, the left side recognition image, the right side recognition image, and the top view image.

Specifically, when a predetermined input is performed by the user of the vehicle 10, the display control unit 56 displays the obstacle information on the touch panel 42 in a superimposed manner on the external environment recognition image. Examples of the predetermined input performed by the user include an operation input from the touch panel 42 and an operation of turning on a switch. In addition, when a moving state of the vehicle 10 is a predetermined state, the display control unit 56 displays the obstacle information on the touch panel 42 in a superimposed manner on the external environment recognition image. Examples of the predetermined moving state include a case where a movement speed of the vehicle 10 is equal to or less than a predetermined speed (for example, 15 km/h), a case where it is recognized based on GPS information, the external environment recognition image, or the like that the vehicle 10 moves into a predetermined parking lot region, and a case where a gear of the vehicle 10 is shifted to a predetermined position.

The EPS system 22 includes a steering angle sensor 100, a torque sensor 102, an EPS motor 104, a resolver 106, and an EPS ECU 108. The steering angle sensor 100 detects a steering angle θst of a steering wheel 110. The torque sensor 102 detects a torque TQ applied to the steering wheel 110.

The EPS motor 104 applies a driving force or a reaction force to a steering column 112 connected to the steering wheel 110, thereby enabling assistance of an operation performed by an occupant on the steering wheel 110 and enabling autonomous steering during parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication with another communication device 120. The other communication device 120 is a base station, a communication device of another vehicle, a smartphone or a tablet terminal carried by the user of the vehicle 10, or the like.

The driving force control system 26 includes a driving ECU 130. The driving force control system 26 executes driving force control of the vehicle 10. The driving ECU 130 controls a driving force of the vehicle 10 by controlling an engine or the like (not shown) based on an operation performed on an accelerator pedal (not shown) by the user.

The braking force control system 28 includes a braking ECU 132. The braking force control system 28 executes braking force control of the vehicle 10. The braking ECU 132 controls a braking force of the vehicle 10 by controlling a brake mechanism (not shown) or the like based on an operation performed on a brake pedal (not shown) by the user.

Example of Control Performed by Calculation Unit 52

Figure 4:
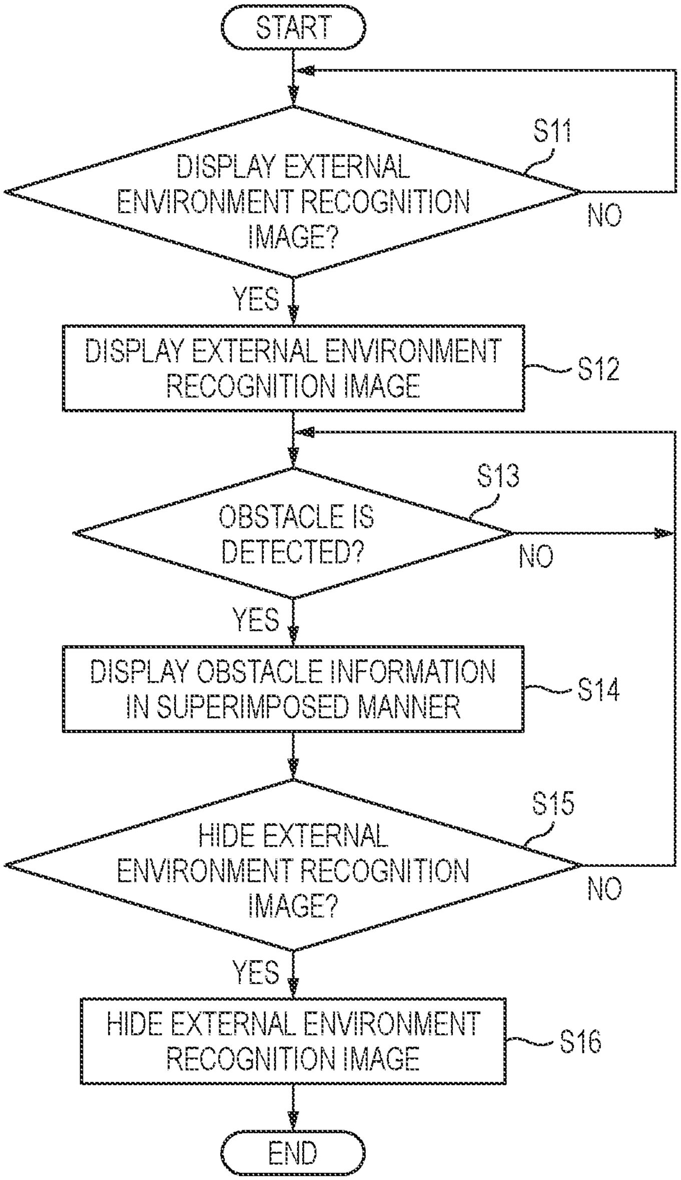
FIG. 4 is a flow chart showing display control performed by a calculation unit on an external environment recognition image and obstacle information.

Next, an example of display control performed by the calculation unit 52 of the vehicle 10 on the external environment recognition image and the obstacle information will be described with reference to a flow chart shown in FIG. 4.

For example, the user who drives the vehicle 10 attempts to park the vehicle 10 in a parking space in a parking lot. For example, it is assumed that the vehicle 10 is traveling at a low speed (for example, 15 km/h or less) or is stopped. For example, when the traveling state of the vehicle 10 is detected based on a detection value of the vehicle speed sensor 36, the calculation unit 52 of the vehicle 10 starts processing shown in FIG. 4.

The display control unit 56 of the calculation unit 52 determines whether to display the external environment recognition image obtained by the external environment recognition unit 55 on the touch panel 42 of the navigation device 18 (step S11). The external environment recognition image is displayed, for example, when a parking button (not shown) displayed on the touch panel 42 is tapped. Therefore, for example, the display control unit 56 determines whether the parking button is tapped by the user.

In step S11, when the external environment recognition image is not to be displayed on the touch panel 42, that is, when the parking button is not tapped (step S11: No), the display control unit 56 repeats the processing of step S11 and stands by until the parking button is tapped.

In step S11, when the external environment recognition image is to be displayed on the touch panel 42, that is, when the parking button is tapped (step S11: Yes), the display control unit 56 displays the external environment recognition image on the touch panel 42 (step S12). For example, when the gear of the vehicle 10 is set to drive, neutral, or parking, the display control unit 56 displays the front recognition image captured by the front camera 12Fr on the touch panel 42. In addition, for example, when the gear of the vehicle 10 is set to reverse, the display control unit 56 displays the rear recognition image captured by the rear camera 12Rr on the touch panel 42. In addition, when the top view image is selected by the user, the display control unit 56 displays the top view image on the touch panel 42.

Next, the obstacle detection unit 57 of the calculation unit 52 determines whether an obstacle is detected in the surrounding area of the vehicle 10 (step S13). As described above, the obstacle in the surrounding area of the vehicle 10 can be detected based on the obstacle information obtained by the sonar groups 32*a* to 32*d*. Examples of the obstacle information include information on a direction of the obstacle with respect to the vehicle 10, information on a distance from the vehicle 10 to the obstacle, and information on in which preset detection regions the obstacle is detected. The preset detection regions will be described later with reference to FIG. 5.

In step S13, when no obstacle is detected in the surrounding area of the vehicle 10 (step S13: No), the obstacle detection unit 57 repeats the processing of step S13 and stands by until an obstacle is detected.

In step S13, when an obstacle is detected in the surrounding area of the vehicle 10 (step S13: Yes), the obstacle detection unit 57 outputs obstacle information on the detected obstacle to the display control unit 56. The display control unit 56 displays the obstacle information outputted from the obstacle detection unit 57 on the touch panel 42 in a superimposed manner on the external environment recognition image (step S14). As described in step S12, the external environment recognition image includes the front recognition image, the rear recognition image, the top view image, and the like. The obstacle information displayed in a superimposed manner on the external environment recognition image will be described later with reference to FIGS. 6 and 7.

Next, the display control unit 56 determines whether to hide the external environment recognition image displayed on the touch panel 42 (step S15). For example, when a parking completion button (not shown) displayed on the touch panel 42 is tapped, the external environment recognition image becomes hidden. Therefore, for example, the display control unit 56 determines whether the parking completion button is tapped by the user.

In step S15, when the external environment recognition image is hidden, that is, when the parking completion button is not tapped (step S15: No), the display control unit 56 returns to step S13 and repeats each processing.

In step S15, when the external environment recognition image is hidden, that is, when the parking completion button is tapped (step S15: Yes), the display control unit 56 hides the external environment recognition image displayed on the touch panel 42 (step S16), and ends the present processing.

<Detection Region and Obstacle Information>

Next, the detection region for detecting the obstacle and the obstacle information indicating the detection result of the obstacle will be described with reference to FIG. 5.

Figure 5:
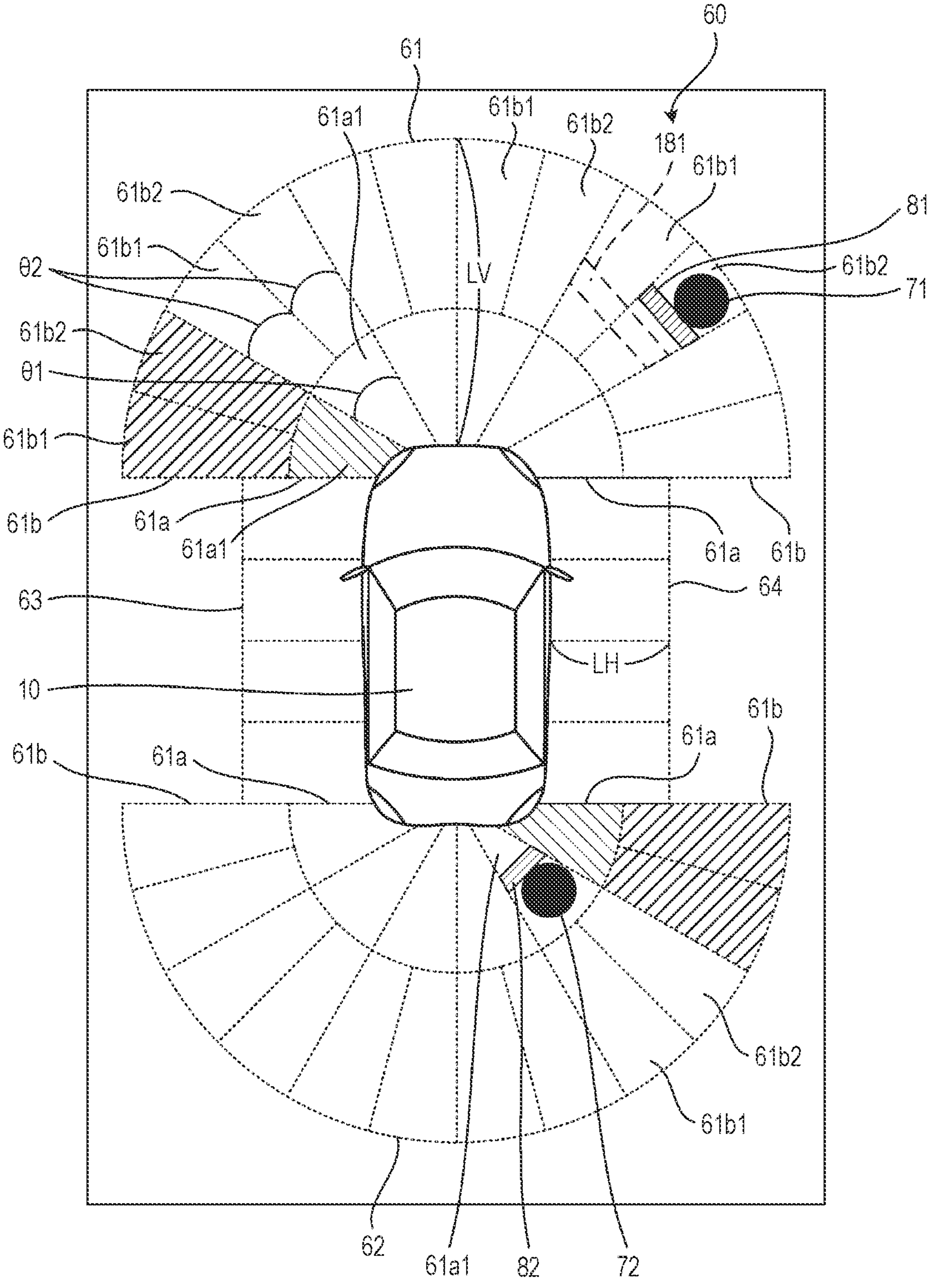
FIG. 5 shows an example of a detection region that can be detected by an obstacle detection unit.

FIG. 5 shows a detection region 60 formed in the surrounding area of the vehicle 10 as viewed from above the vehicle 10. As shown in FIG. 5, the detection region 60 is a region formed around the detection device (for example, the sonar groups 32*a* to 32*d*) mounted on the vehicle 10 and is formed as a region in which an obstacle can be detected. For example, the detection region 60 includes a front detection region 61 formed around the front sonar group 32*a*, a rear detection region 62 formed around the rear sonar group 32*b*, a left side detection region 63 formed around the left side sonar group 32*c*, and a right side detection region 64 formed around the right side sonar group 32*d*.

The front detection region 61 is a detection region formed by a plurality of fan shapes centered at the front sonar group 32*a*. The rear detection region 62 is a detection region formed by a plurality of fan shapes centered at the rear sonar group 32*b*. Each fan-shaped detection region is a detection region in a range in a traveling direction of the vehicle 10, that is, a range on the front side Fr or the rear side Rr of the vehicle 10. In addition, the left side detection region 63 is a detection region formed by a plurality of rectangles centered on the left side sonar group 32*c*. The right side detection region 64 is a detection region formed by a plurality of rectangles centered on the right side sonar group 32*d*. Each rectangular detection region is a detection region in a range in a vehicle width direction of the vehicle 10, that is, a range on the left side L or the right side R of the vehicle 10.

The front sonar group 32*a* and the rear sonar group 32*b* can detect an obstacle within a range of a detection distance LV in a fan-shaped detection range in the traveling direction of the vehicle 10. The left sonar group 32*c* and the right sonar group 32*d* can detect an obstacle within a range of a detection distance LH in a rectangular detection range in the vehicle width direction of the vehicle 10. The detection distance LV in the traveling direction is configured to be longer than the detection distance LH in the vehicle width direction.

The front detection region 61 formed by the plurality of fan shapes includes an inner detection region group 61*a* disposed on a side close to the vehicle 10 and an outer detection region group 61*b* disposed on a side farther from the vehicle 10 than the inner detection region group 61*a*. The inner detection region group 61*a* is an example of a first detection region group in the present disclosure. The outer detection region group 61*b* is an example of a second detection region group in the present disclosure. Since the front detection region 61 and the rear detection region 62 have the same configuration, the following description will focus on the front detection region 61.

A size of a central angle of each of the plurality of fan-shaped detection regions is set according to a distance from the vehicle 10 to the detection region. Specifically, the size of the central angle of the fan shape in a detection region disposed on a side far from the vehicle 10 is smaller than the size of the central angle of the fan shape in a detection region disposed on a side close to the vehicle 10. In the example shown in the drawing, the inner detection region group 61*a* is formed by one fan-shaped inner detection region portion 61*al*, whereas the outer detection region group 61*b* is divided into two fan shapes, that is, outer detection region portions 61*b*1 and 61*b*2. Accordingly, a central angle θ2 of the outer detection region portions 61*b*1 and 61*b*2 is smaller than a central angle θ1 of the inner detection region portion 61*al*. In addition, the number of outer detection region portions is larger than the number of inner detection region portions.

In the detection region configured as described above, the sonar group of the vehicle 10 detects in which fan shape or in which rectangle an obstacle in the surrounding area of the vehicle 10 is located. The sonar groups 32*a* to 32*d* detect a direction and a distance of the obstacle based on sound waves emitted to the surrounding area of the vehicle 10 and reflected sounds received from the obstacle, and detect a position of the fan shape or rectangle where the obstacle is present based on the detected direction and distance. A position of the detected obstacle is displayed in the region where the obstacle is detected as the obstacle information indicating the detection result of the obstacle. For example, when the obstacle is detected in the front detection region 61 or the rear detection region 62, the obstacle information is represented as corresponding to the size of the central angle of the fan shape of the region in which the obstacle is detected.

Specifically, in FIG. 5, an obstacle 71 on a right front side of the vehicle 10 is an obstacle detected in the fan shape of the outer detection region portion 61*b*2 in the front detection region 61. Therefore, obstacle information on the obstacle 71 is displayed as, for example, band-shaped obstacle information 81 extending corresponding to the central angle θ2 of the fan shape of the outer detection region portion 61*b*2. In addition, an obstacle 72 on a right rear side of the vehicle 10 is an obstacle detected in the fan shape of the inner detection region portion 61*al* in the rear detection region 62. Therefore, obstacle information on the obstacle 72 is displayed as, for example, band-shaped obstacle information 82 extending corresponding to the central angle θ1 of the fan shape of the inner detection region portion 61*al*.

<Obstacle Information Displayed on External Environment Recognition Image>

Next, an example of the obstacle information displayed in a superimposed manner on the external environment recognition image will be described with reference to FIGS. 6 and 7.

Figure 6:
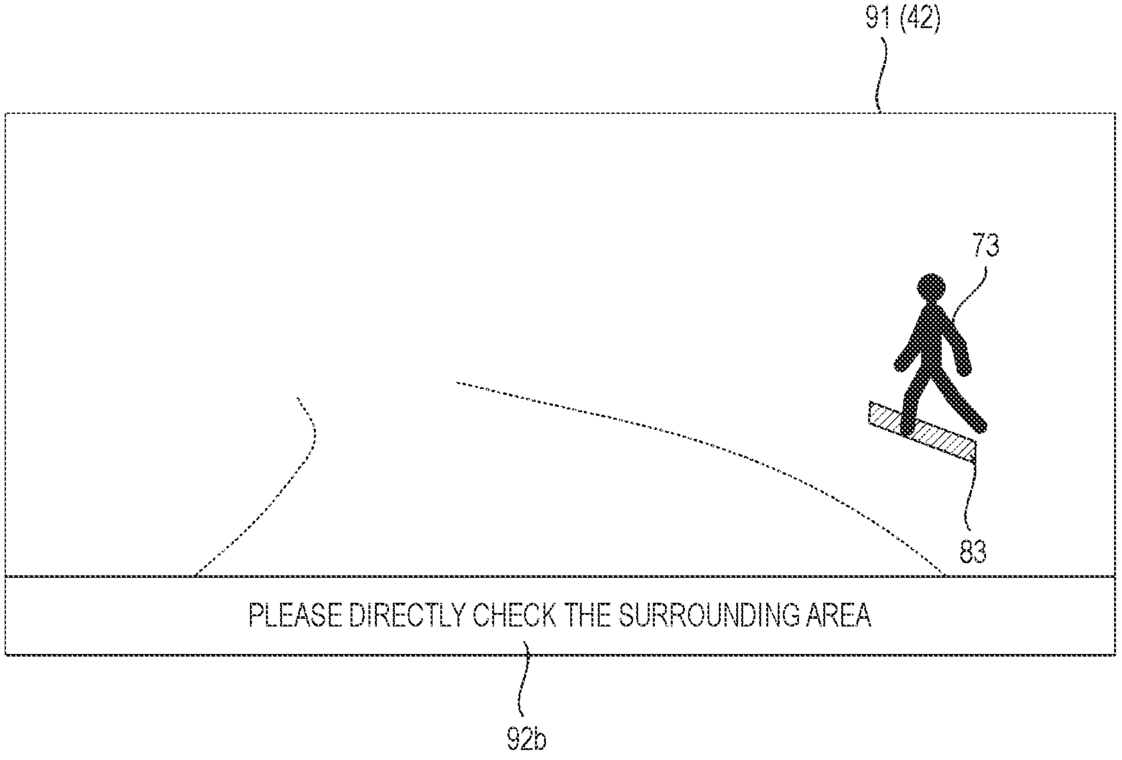
FIG. 6 shows an example of obstacle information displayed on a front recognition image.

FIG. 6 shows an example of the front recognition image captured by the front camera 12Fr of the vehicle 10 and obstacle information displayed in a superimposed manner on the front recognition image. For example, it is assumed that the vehicle 10 in FIG. 6 is searching for a parking space in which the vehicle 10 is to be parked in a certain parking lot.

As shown in FIG. 6, a front recognition image 91 captured by the front camera 12Fr is displayed on the touch panel 42. In the front recognition image 91, an image of a person (obstacle) 73 is captured on the right front side of the vehicle 10. The front sonar group 32*a* detects a direction and a distance of the person 73 with respect to the vehicle 10 and detects a position of a fan shape where the person 73 is present. At the detected position of the fan shape, obstacle information corresponding to a central angle (see FIG. 5) of the fan shape is displayed as band-shaped obstacle information 83 in a superimposed manner at the position of the person 73 in the front recognition image 91. When the user of the vehicle 10 notices the person 73 and stops by stepping on the brake, a message 92*b* such as "please directly check the surrounding area" is displayed on the front recognition image 91 on the touch panel 42.

Figure 7:
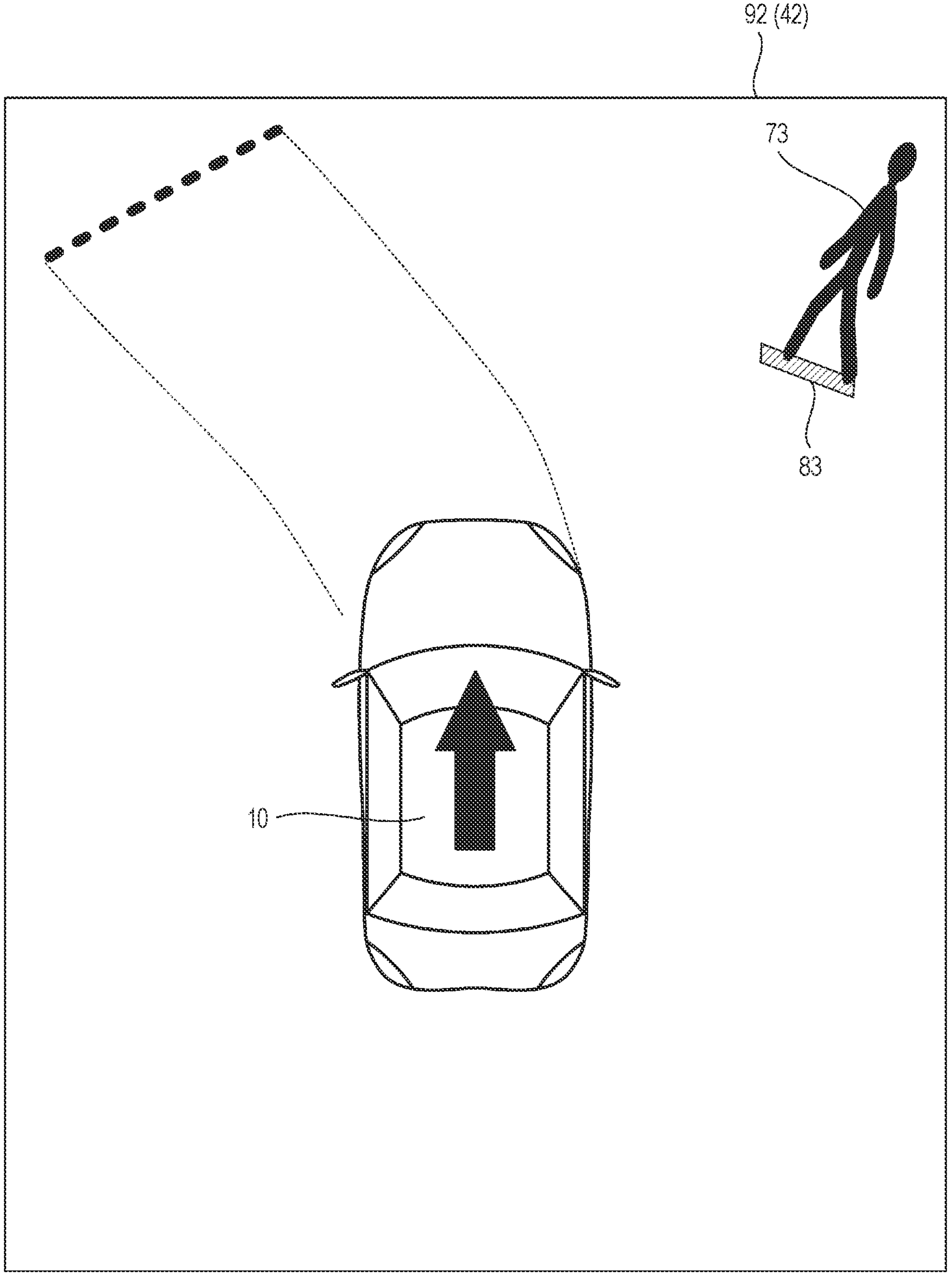
FIG. 7 shows an example of obstacle information displayed on a top view image.

FIG. 7 shows an example of the top view image generated based on imaging data of the cameras 12Fr, 12Rr, 12L, and 12R including the front recognition image shown in FIG. 6 and obstacle information displayed in a superimposed manner on the top view image. Similarly to FIG. 6, the vehicle 10 in FIG. 7 is searching for a parking space in which the vehicle 10 is to be parked in a certain parking lot.

As shown in FIG. 7, the touch panel 42 displays a top view image 92 generated based on the imaging data of the cameras 12Fr, 12Rr, 12L, and 12R. In the top view image 92, the image of the person (obstacle) 73 is captured on the right front side of the vehicle 10, as in FIG. 6. In addition, the position of the fan shape where the person 73 is present is detected based on the direction and the distance of the person 73 with respect to the vehicle 10, which are detected by the front sonar group 32*a*, and the band-shaped obstacle information 83 corresponding to the central angle (see FIG. 5) of the fan shape at the detected position of the fan shape is displayed in a superimposed manner at the position of the person 73. The top view image 92 may be displayed on the touch panel 42 side by side with the front recognition image 91 shown in FIG. 6.

In a configuration of the detection region formed in the surrounding area of the vehicle 10 in the related art, for example, in the detection region 60 shown in FIG. 5, the central angle θ1 of the inner detection region portion 61*al* in the inner detection region group 61*a* of the front detection region 61 and the rear detection region 62 is the same as the central angle θ2 of the outer detection region portion 61*b*1 in the outer detection region group 61*b* (θ1=θ2). That is, the outer detection region portion in the outer detection region group 61*b* is formed as one outer detection region portion. Therefore, when the obstacle 72 in FIG. 5 is detected, the same band-shaped obstacle information 81 as the obstacle information 82 shown in FIG. 5 is displayed in a superimposed manner, whereas band-shaped obstacle information extending corresponding to the central angle θ1=θ2, for example, band-shaped obstacle information 181 indicated by a broken line is displayed in a superimposed manner when the obstacle 71 is detected. Therefore, band-shaped obstacle information superimposed on a farther obstacle is longer in an arc direction, which is excessively large with respect to the obstacle displayed in an actual camera image, and thus there is a sense of discomfort.

On the other hand, in a case where the obstacle information 83 indicating the detection result of the person (obstacle) 73 is displayed in a superimposed manner on the external environment recognition image (the front recognition image 91 and the top view image 92), the display control unit 56 of the calculation unit 52 in the present embodiment displays the obstacle information 81 and 82 in the regions (the inner detection region portion 61*a*1 and the outer detection region portion 61*b*2) in which the obstacles 71 and 72 are detected among the plurality of fan-shaped detection regions 60 centered on the vehicle 10 when viewed from above the vehicle 10, for example, as shown in FIG. 5. The size of the central angle of the fan-shaped detection region 60 is set according to the distance from the vehicle 10. With this configuration, the obstacle information 81 and 82 can be displayed in an accurate range regardless of the distance between the vehicle 10 and the obstacles 71 and 72. Accordingly, a sense of discomfort that the obstacle information is displayed excessively large with respect to the obstacle displayed as an actual camera image can be prevented, and thus safety of the vehicle 10 can be improved.

In addition, the front detection region 61 and the rear detection region 62 formed by the plurality of fan shapes include the inner detection region group 61*a* disposed on the side close to the vehicle 10 and the outer detection region group 61*b* disposed on the side farther from the vehicle 10 than the inner detection region group 61*a*. The central angle θ2 of the outer detection region portions 61*b*1 and 61*b*2 in the outer detection region group 61*b* is smaller than the central angle θ1 of the inner detection region portion 61*al* in the inner detection region group 61*a* Accordingly, since the outer detection region portions 61*b*1 and 61*b*2 of the outer detection region group 61*b* that is far from the vehicle 10 are arranged more finely than the inner detection region portion 61*al* of the inner detection region group 61*a* that is close to the vehicle 10, even when an obstacle is present in the distance, an obstacle range indicated by the obstacle information can be prevented from being excessively wide relative to an actual size of the obstacle, and thus it is possible to improve the safety of the vehicle 10.

In addition, the detection distance LV within which the front sonar group 32*a* and the rear sonar group 32*b* can detect an obstacle in the traveling direction of the vehicle 10 is longer than the detection distance LH within which the left side sonar group 32*c* and the right side sonar group 32*d* can detect an obstacle in the vehicle width direction of the vehicle 10. Each fan-shaped detection region is a detection region in a range in the traveling direction of the vehicle 10, that is, a range on the front side Fr or the rear side Rr of the vehicle 10. Accordingly, by setting the detection distance LV in the range in the traveling direction of the vehicle 10 to be longer, a distant obstacle can be detected at an early stage. Therefore, it is possible to reduce a risk of contact with the obstacle due to movement of the vehicle 10, and thus the safety of the vehicle 10 can be improved.

In addition, for example, when the user of the vehicle 10 performs an operation input to the touch panel 42, the display control unit 56 displays the obstacle information on the touch panel 42 in a superimposed manner on the external environment recognition image. Accordingly, it is possible to display the obstacle information in a superimposed manner on the external environment recognition image when it is necessary to display the obstacle information, and thus the safety of the vehicle 10 is improved.

In addition, when the movement speed of the vehicle 10 is equal to or less than a predetermined speed or when it is recognized that the vehicle 10 moves into a predetermined parking lot region, the display control unit 56 displays the obstacle information on the touch panel 42 in a superimposed manner on the external environment recognition image. Accordingly, it is possible to display the obstacle information in a superimposed manner on the external environment recognition image when it is necessary to display the obstacle information, and thus the safety of the moving body is improved.

Although the embodiment of the present disclosure is described above, the present invention is not limited to the above embodiment, and modifications, improvements, and the like can be made as appropriate.

For example, although the case where the vehicle 10 is parked is described in the above embodiment, the same control can be performed when the vehicle 10 exits.

The control method described in the above embodiment can be implemented by executing a control program prepared in advance on a computer. The control program is recorded in a computer-readable storage medium and is executed by being read from the storage medium. In addition, the control program may be provided in a form stored in a non-transitory storage medium such as a flash memory or may be provided via a network such as the Internet. The computer that executes the control program may be provided in a control device, may be provided in an electronic device such as a smartphone, a tablet terminal, or a personal computer capable of communicating with the control device or may be provided in a server device capable of communicating with the control device and the electronic device.

In addition, at least the following matters are described in the present specification. Although corresponding constituent elements and the like in the above embodiment are shown in parentheses, the present invention is not limited thereto.

(1) A control device including:

an external environment recognition unit (external environment recognition unit 55) configured to obtain an external environment recognition image representing a recognition result of a surrounding area of a moving body (vehicle 10);

an obstacle detector (obstacle detection unit 57) configured to obtain obstacle information (obstacle information 81, 82) representing a detection result of an obstacle (obstacle 71, 72) in the surrounding area of the moving body; and a display controller (display control unit 56) configured to display the obstacle information on a display device (touch panel 42) in a superimposed manner on the external environment recognition image, in which the obstacle information indicates a region in which the obstacle is detected among a plurality of fan-shaped detection regions (detection region 60) centered at the moving body when viewed from above the moving body, and a size of a central angle of the fan-shaped detection region is set according to a distance from the moving body.

According to (1), it is possible to display the obstacle information in an accurate range regardless of the distance between the moving body and the obstacle, and thus safety of the moving body can be improved.

(2) The control device according to (1), in which the plurality of fan-shaped detection regions include a first detection region group and a second detection region group that is farther from the moving body than the first detection region group and whose fan shape has a smaller central angle than that of the first detection region group.

According to (2), since each detection region of the second detection region group that is far from the moving body is arranged more finely than each detection region of the first detection region group that is close to the moving body, even when an obstacle is present in the distance, an obstacle range indicated by the obstacle information can be prevented from being excessively wide with respect to an actual size of the obstacle, and thus the safety of the moving body can be improved.

(3) The control device according to (1) or (2), in which a detection distance of the obstacle detector in a range in a traveling direction of the moving body is longer than a detection distance of the obstacle detector in a range in a vehicle width direction of the moving body, and the plurality of fan-shaped detection regions are provided in a range in the traveling direction of the moving body.

According to (3), by setting the detection distance in the range in the traveling direction of the moving body to be longer, a distant obstacle can be detected at an early stage, and it is possible to reduce a risk of contact with the obstacle due to movement of the moving body, and thus the safety of the moving body can be improved.

(4) The control device according to any one of (1) to (3), in which the display controller displays the obstacle information on the display device in a superimposed manner on the external environment recognition image when a predetermined input is performed by a user of the moving body.

According to (4), it is possible to display the obstacle information in a superimposed manner in a scene in which it is necessary to display the obstacle information, and thus the safety of the moving body is improved.

(5) The control device according to any one of (1) to (4), in which the display controller displays the obstacle information on the display device in a superimposed manner on the external environment recognition image when a moving state of the moving body is a predetermined state.

According to (5), it is possible to display the obstacle information in a superimposed manner in a scene in which it is necessary to display the obstacle information, and thus the safety of the moving body is improved.

(6) A control method performed by a control device, including:

obtaining an external environment recognition image representing a recognition result of a surrounding area of a moving body, obtaining obstacle information representing a detection result of an obstacle in the surrounding area of the moving body, and displaying the obstacle information on a display device in a superimposed manner on the external environment recognition image, in which the obstacle information indicates a region in which the obstacle is detected among a plurality of fan-shaped detection regions centered at the moving body when viewed from above the moving body, and a size of a central angle of the fan-shaped detection region is set according to a distance from the moving body.

According to (6), it is possible to display the obstacle information in an accurate range regardless of the distance between the moving body and the obstacle, and thus safety of the moving body can be improved.

(7) A non-transitory computer-readable recording medium storing a control program for causing a processor of a control device to execute a process, the process including:

obtaining an external environment recognition image representing a recognition result of a surrounding area of a moving body, obtaining obstacle information representing a detection result of an obstacle in the surrounding area of the moving body, and displaying the obstacle information on a display device in a superimposed manner on the external environment recognition image, in which the obstacle information indicates a region in which the obstacle is detected among a plurality of fan-shaped detection regions centered at the moving body when viewed from above the moving body, and a size of a central angle of the fan-shaped detection region is set according to a distance from the moving body.

According to (7), it is possible to display the obstacle information in an accurate range regardless of the distance between the moving body and the obstacle, and thus safety of the moving body can be improved.

The invention claimed is:

1. A control device comprising:

circuitry configured to:

obtain an external environment recognition image representing a recognition result of a surrounding area of a moving body;

obtain obstacle information representing a detection result of an obstacle in the surrounding area of the moving body; and display the obstacle information on a display device in a superimposed manner on the external environment recognition image, wherein the obstacle information indicates a first fan-shaped detection region in which the obstacle is detected among a plurality of fan-shaped detection regions centered at the moving body when viewed from above the moving body, and a size of a central angle of each of the plurality of fan-shaped detection regions is set according to a distance from the moving body.

2. The control device according to claim 1, wherein the plurality of fan-shaped detection regions include a first detection region group and a second detection region group that is farther from the moving body than the first detection region group and whose fan shape has a smaller central angle than that of the first detection region group.

3. The control device according to claim 1, wherein a detection distance in a range in a traveling direction of the moving body is longer than a detection distance in a range in a vehicle width direction of the moving body, and the plurality of fan-shaped detection regions are provided in a range in the traveling direction of the moving body.

4. The control device according to claim 1, wherein the circuitry displays the obstacle information on the display device in a superimposed manner on the external environment recognition image when a predetermined input is performed by a user of the moving body.

5. The control device according to claim 1, wherein the circuitry displays the obstacle information on the display device in a superimposed manner on the external environment recognition image when a moving state of the moving body is a predetermined state.

6. The control device according to claim 1, wherein the external environment recognition image is generated using data obtained from cameras and the obstacle information is generated using data obtained from sonars.

7. A control method performed by a control device, comprising:

obtaining an external environment recognition image representing a recognition result of a surrounding area of a moving body, obtaining obstacle information representing a detection result of an obstacle in the surrounding area of the moving body, and displaying the obstacle information on a display device in a superimposed manner on the external environment recognition image, wherein the obstacle information indicates a first fan-shaped detection region in which the obstacle is detected among a plurality of fan-shaped detection regions centered at the moving body when viewed from above the moving body, and a size of a central angle of each of the plurality of fan-shaped detection regions is set according to a distance from the moving body.

8. A non-transitory computer-readable recording medium storing a control program for causing a processor of a control device to execute a process, the process comprising:

obtaining an external environment recognition image representing a recognition result of a surrounding area of a moving body, obtaining obstacle information representing a detection result of an obstacle in the surrounding area of the moving body, and displaying the obstacle information on a display device in a superimposed manner on the external environment recognition image, wherein the obstacle information indicates a first fan-shaped detection region in which the obstacle is detected among a plurality of fan-shaped detection regions centered at the moving body when viewed from above the moving body, and a size of a central angle of each of the plurality of fan-shaped detection regions is set according to a distance from the moving body.

* * * * *